United States Patent [19]

Petrelis

[11] 4,061,989

[45] Dec. 6, 1977

[54] REDUNDANCY SWITCHING SYSTEM

[75] Inventor: Peter G. Petrelis, Huntington Beach, Calif.

[73] Assignee: TRW Inc., Redondo Beach, Calif.

[21] Appl. No.: 609,852

[22] Filed: Sept. 2, 1975

[51] Int. Cl.² .............................................. H01P 1/10
[52] U.S. Cl. .............................. 333/7 R; 343/100 ST
[58] Field of Search ...................... 343/6.5 R, 100 ST; 333/7 R, 7 D; 307/23, 43, 64, 65

[56] References Cited

U.S. PATENT DOCUMENTS

| | | | |
|---|---|---|---|
| 3,009,118 | 11/1961 | Stinson | 333/7 R |
| 3,537,035 | 10/1970 | Graham | 333/7 R |
| 3,808,566 | 4/1974 | Thompson et al. | 333/7 R X |
| 3,953,853 | 4/1976 | Carter et al. | 333/7 R X |

OTHER PUBLICATIONS

Assal et al.; "Network Topologies to Enhance Satellite Reliability"; Comsat Technical Review; vol. 6, No. 2, pp. 309-321.

Primary Examiner—T.H. Tubbesing
Attorney, Agent, or Firm—John J. Connors; Edwin A. Oser; Benjamin DeWitt

[57] ABSTRACT

A redundancy switching system particularly suitable for transponders of the type used in spacecraft. A plurality of elements such as amplifiers is selectively connectable to a similar plurality of terminals such as input or output ports by switches. For each amplifier there is provided one switch and the switches are interconnected to form a closed loop. The switches may have three or four-port configuration and may be double-pole or triple-pole transfer switches, wafer switches, waveguide transfer switches or the like. In another form of the invention each element is connected to one output port by a switch and additional redundant elements are cross-connected to each other by extra switches so that failed elements can be replaced by standby elements.

12 Claims, 10 Drawing Figures

REDUNDANCY SWITCHING SYSTEM

BACKGROUND OF THE INVENTION

This invention relates generally to transponders and particularly relates to a redundancy switching system therefor.

Transponders of the type used particularly in spacecraft usually require a considerable amount of redundancy to provide for failure of one or more of the key elements of the system. In the past, it has been conventional practice to provide redundancy by using one standby unit for each active unit. Simple switches may be used to replace a failed unit and this has shown to provide a moderate increase in reliability.

Many transponders consist of transmission channels utilizing many identical units such, for example, as traveling wave tube amplifiers. In that case, providing one standby amplifier for each active amplifier significantly increases the weight without optimizing reliability.

In a switch system, for example, the transmitters and antennas could be interconnected by a matrix which may utilize, for example, crossbar switches, or diodes and the like to switch in a standby unit for a failed unit. Generally, such systems cannot be used for microwaves. The required switching has frequently resulted in mechanically complex configurations providing high signal loss.

It is, therefore, an object of the present invention to provide a redundancy switching system for transponders of the type having equal elements such as amplifiers which can be readily realized and where the weight and size are linearly proportional to the number of elements.

A further object of the present invention is to provide a redundancy switching system of the type discussed where the switches themselves are redundant.

Another object of the present invention is to provide a redundancy switching system of the type referred to which requires no more than two mechanical transfer switches for each amplifier or element.

SUMMARY OF THE INVENTION

The redundancy switching system of the invention is particularly applicable to a transponder. It includes a first plurality of elements which are identical. These elements may, for example, consist of amplifiers or other active elements. There is further provided a second plurality of terminals such as output or input ports. The total number of terminals is smaller than the total number of elements so that standby elements are provided. Switching means are connected to each element, and all of the switching means are interconnected in a closed loop. Thereby upon failure of one of the elements a standby element can be connected to one of the output ports. The switches may have three or four-port configuration. They may consist of conventional transfer switches which may be coaxial, wafer switches or waveguide transfer switches. Electronic diode switches may also be used.

The novel features that are considered characteristic of this invention are set forth with particularity in the appended claims. The invention itself, however, both as to the organization and method of operation, as well as additional objects and advantages thereof, will best be understood from the following description when read in connection with the accompanying drawings.

DESCRIPTION OF THE PREFERRED EMBODIMENTS

Figure 1:
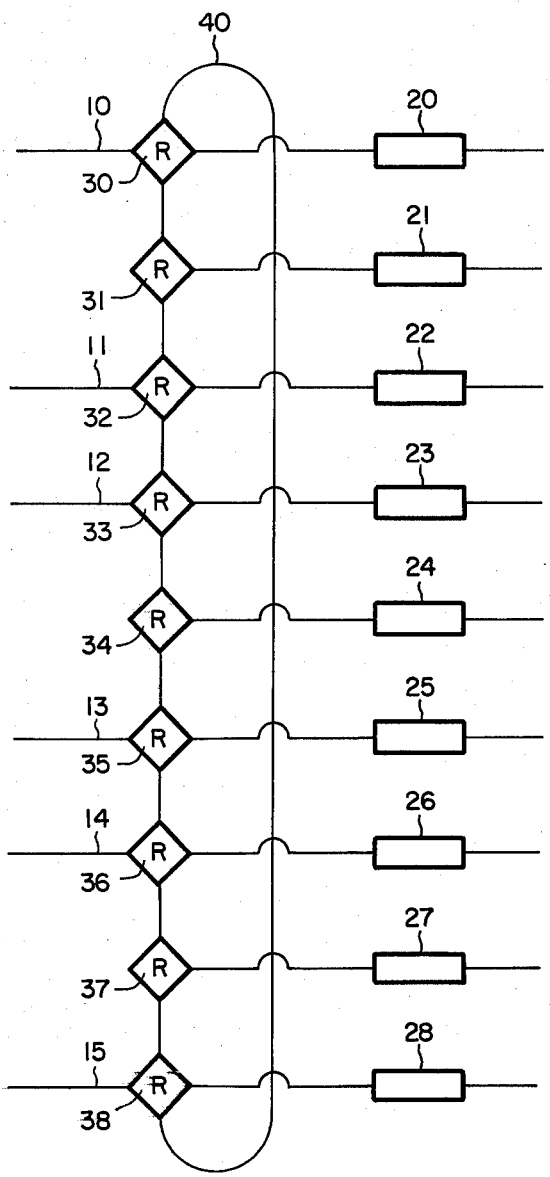
FIG. 1 is a schematic representation of a switching system embodying the present invention and providing three more elements than output ports.

Referring now to the drawings and particularly to FIG. 1, there is illustrated an embodiment of the redundancy switching system of the invention. This system may be used, for example, in any conventional transponder such, for example, as frequency-division multiple-access or time-division multiple-access transponders. The system of FIG. 1 includes a number of output or input ports 10, 11, 12, 13, 14 and 15, that is six output ports. On the other hand, it includes nine elements 20, 21, 22, 23, 24, 25, 26, 27 and 28. The elements may, for example, consist of amplifiers or the like active elements. Each element 20 – 28 is associated or connected with a switch 30, 31, 32, 33, 34, 35, 36, 37 and 38, designated R. It will be noted that the nine switches 30 – 38 form a closed loop as shown by the lead 40.

The output ports 10 – 15 may, for example, connect to an antenna, another amplifier or the like. It will be noted that the number of elements 20 is greater than the number of output ports 10 – 15 by 3. In other words, if M is the number of elements 20 – 28 and N is the number of ports 10 – 15, M − N = 3.

It will thus be seen that element 20 is connected to output port 10 by switch 30. Similarly, element 22 is connected to output port 11 by switch 32; element 23 is connected to output port 12 by switch 33. Similarly, elements 25, 26 and 28 are connected to output ports 13, 14 and 15 by switches 35, 36 and 38 respectively. Hence, elements 21, 24 and 27 are standby elements. It will be understood, however, that ports 10 – 15 may equally well be input ports rather than output ports.

Assuming now that elements 22 fails; in this case port 11 can be connected to standby element 21 by operation of switches 31 and 32. Assuming now that element 21 also fails; in this case port 11 may be connected by switches 32, 33 and 34 to standby element 24. Finally, assuming that element 23 in addition fails, that is elements 21 – 23 have all failed; in this case port 10 may be connected by operation of switch 30 through lead 40 and switch 38 to element 28. Port 15 can be connected by operation of switches 37 and 38 to element 27, port 12 can be connected by operation of switches 33 and 34 to element 24. Finally, port 11 can be connected by operation of switches 32, 31 and 30 to element 20.

However, if more than 3 elements should fail, it is no longer possible to switch the ports to a standby element because standby elements are no longer available. However, any particular port can still be connected to an active element until all elements are used up.

Preferably, M − N is large for optimum redundancy. It is, however, even possible that M = N is long as one of the ports can be omitted in the event of a failure.

By reference to FIGS. 2 – 9 the switches will now be explained which may be used in the system of the invention. The switch may consist of a four-port configuration or a three-port configuration. Thus for a four-port configuration input port 1 may be connected selectively to output ports 2, 3 or 4. Input port 2 may be connected to output ports 3 or 4 and finally input port 3 may be connected to output ports 2 or 4. On the other hand, for a three-port configuration input port 2 can be connected to either output ports 3 or 4 and input port 3 can be connected to output ports 2 or 4.

Figure 2:
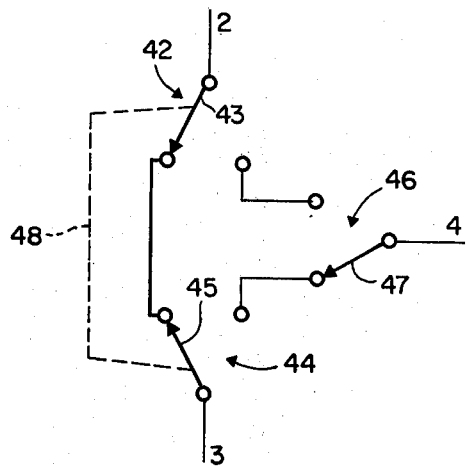
FIG. 2 illustrates by way of example a three-port, two-pole set of three transfer switches which may be used in the system of FIG. 1.

Thus a sample three-port configuration is shown in FIG. 2 which makes use of three double-pole switches. Thus switch 42 has a switch arm 43 which may connect in the position shown input port 2 to output port 3 by switch 44 and switch arm 45. The system of FIG. 2 also includes a switch 46 having a switch arm 47 which connects to the output port 4. The two switch arm 43 and 45 are ganged together as shown at 48. However, switch arm 47 is movable independently.

Assuming that switch arm 47 remains in the position of FIG. 2 while switch arms 43, 45 are moved to their alternate position port 3 is connected to port 4 through switch arms 45, 46. Input port 2 can be connected to port 4 by rotating switch arm 47 so that the connection is made through switch arms 43, 47.

Figure 3:
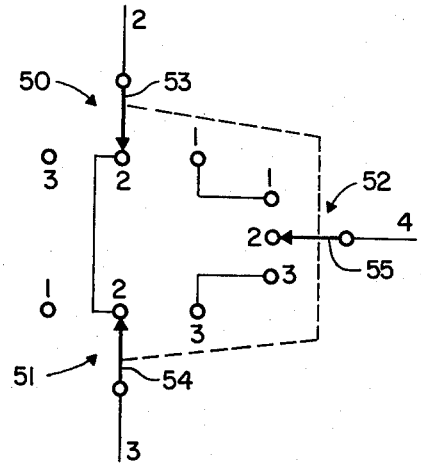
FIG. 3 illustrates a three-port configuration formed by three ganged, three-pole switches.
Figure 4:
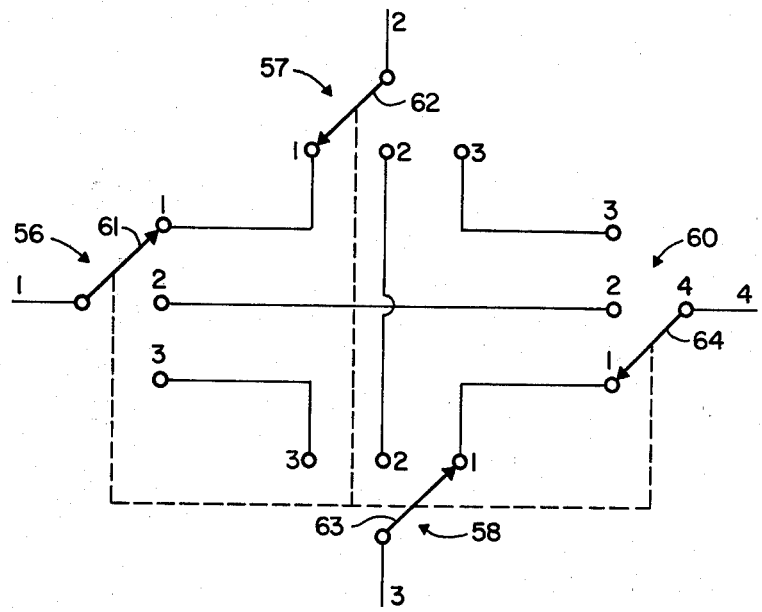
FIG. 4 illustrates a four-port configuration made up of four three-port ganged transfer switches.

FIG. 3 shows a three-port configuration which is made up of three three-pole ganged switches. The three switches 50, 51 and 52 each have a movable switch arm 53, 54 and 55 respectively. In the configuration shown ports 2 and 3 are connected. If the three switches are thrown each into their position 1, port 2 is connected to port 4 through switch arms 53 and 55. If the three switches are thrown into position 3, port 3 is connected to port 4 through switch arms 54 and 55.

A four-pole configuration is illustrated in FIG. 4 which again may consist of four three-pole transfer switches. The three switches 56, 57, 58 and 60 are provided with the switch arms 61, 62, 63 and 64 respectively. In the position illustrated ports 1 and 2 are connected through switch arms 61, 62. At the same time ports 3 and 4 are connected through switch arms 63, 64. If the three switches are thrown into their 2-position ports 2 and 3 are connected as are ports 1 and 4. Finally when the four switches are thrown into their 3-position ports 1 and 3 are connected and ports 2 and 4.

Figure 5:
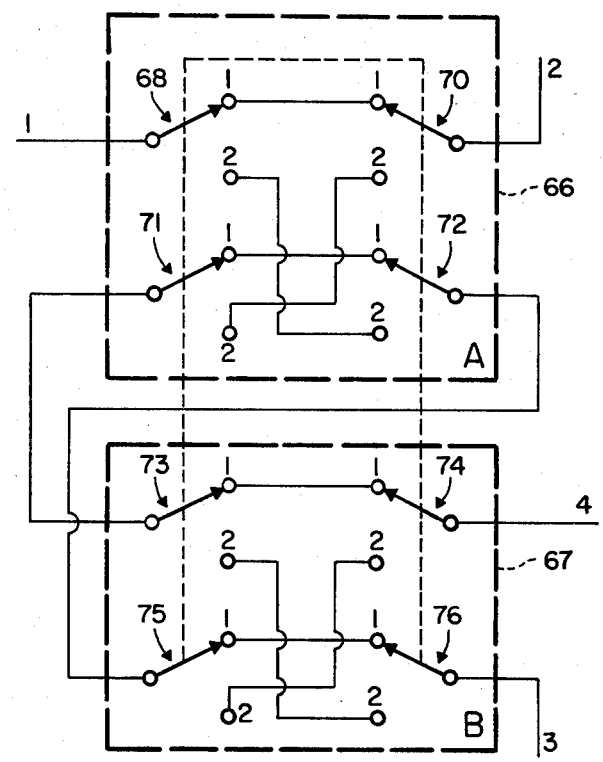
FIG. 5 illustrates a four-port configuration made up of two pairs of four three-pole switches each of which consist of coaxial or contact switches.

FIG. 5 shows another four-port configuration consisting of two sets of four-pole switches there being four switches in each set. The two sets of switches are shown by dotted boxes 66 and 67. They may be coaxial switches or contact switches. Thus within the box 66 there are four switches 68, 70, 71 and 72 while the other box 67 contains switches 73, 74, 75 and 76.

When the eight switches are in the position shown in FIG. 5, port 1 is connected to port 2 by switches 68, 70. Port 3 is connected through port 2 through switches 76, 75, 72, 71, 73 and 74 all connected in series.

Assuming now that the eight switches are thrown into their other position then port 1 is connected to port 4 through switches 68, 72, 75 and 74. Port 2 is connected to port 3 through switches 70, 71, 73 and 76. Assuming, however, that only the four switches in the box 66 are thrown to the other position, then port 1 is connected to port 3 and port 2 is connected to port 4. Even though there are four states, three are unique and, therefore, the system provides switch redundancy which is another unique feature of the present invention.

Figure 6:
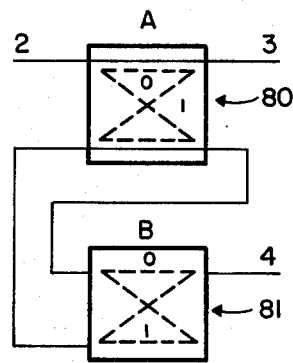
FIG. 6 shows a three-port configuration which may consist of two sets of interconnected switches which may be mechanical transfer switches or waveguide switches.
Figure 7:
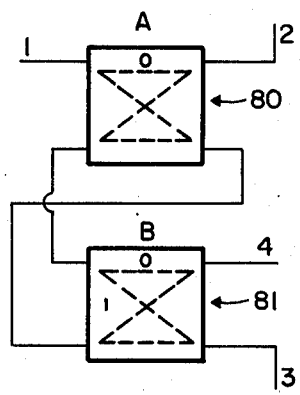
FIG. 7 shows a configuration similar to that of FIG. 6 but providing four ports.

Another switching system is illustrated in FIG. 6 for a three port configuration. Here port 2 is connected to port 3 through a switching mechanism 80 which may consist, for example, of a wavelength as will be explained in connection with FIGS. 8 and 9. By rotation of the switch mechanism 80 the input port 2 may be connected to the output port 4 by the switch mechanism 81. Finally, port 3 may be connected to port 4 by rotation of the switch mechanism 81.

The four-port configuration of FIG. 7 again has two switching mechanisms 80 and 81 and in this case input port 1 may be connected to output port 2 or to output ports 3 or 4 by selective rotation of the two switch mechanisms 80 and 81. Similarly input port 2 may be connected to output ports 3 and 4 or finally input port 3 may be connected to output ports 2 or 4.

Figure 8:
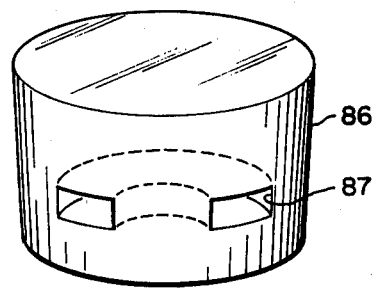
FIGS. 8 and 9 are a view in perspective and a plan view respectively of a waveguide switch which may be used with the configurations of FIGS. 6 and 7.
Figure 9:
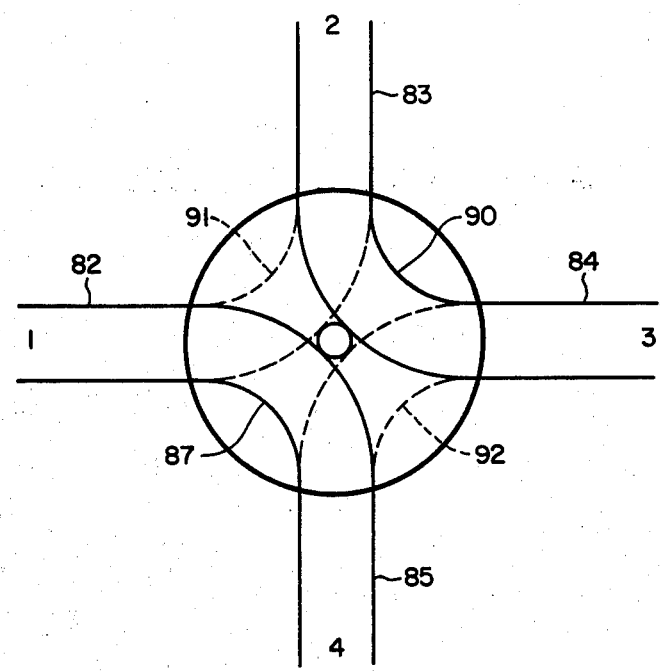

How this can be accomplished is illustrated in FIGS. 8 and 9. The various ports 1 – 4 are represented by separate waveguides 82, 83, 84 and 85. Disposed within the four waveguides 82 – 85 is a metallic cylinder 86 having a slot or opening 87 forming a waveguide and extending over a quarter of a circle. There will, of course, be two of these slots 87 disposed 180° apart. Thus, the aperture 87 can connect waveguides 82 to 85. The other aperture 90 may connect waveguides 83 to 84. By a rotation through 90° waveguide 82 is connected to waveguide 83 as shown by dotted lines 91 and similarly waveguide 85 is connected to waveguide 84 as shown by dotted lines 92. Such a waveguide switch is, of course, eminently suitable for microwaves.

It should be noted that the switches illustrated in FIGS. 2 – 9 are all conventional and that other switches or switch configurations may be used instead. The switches may be operated mechanically or electrically like relays or diodes may be used.

Figure 10:
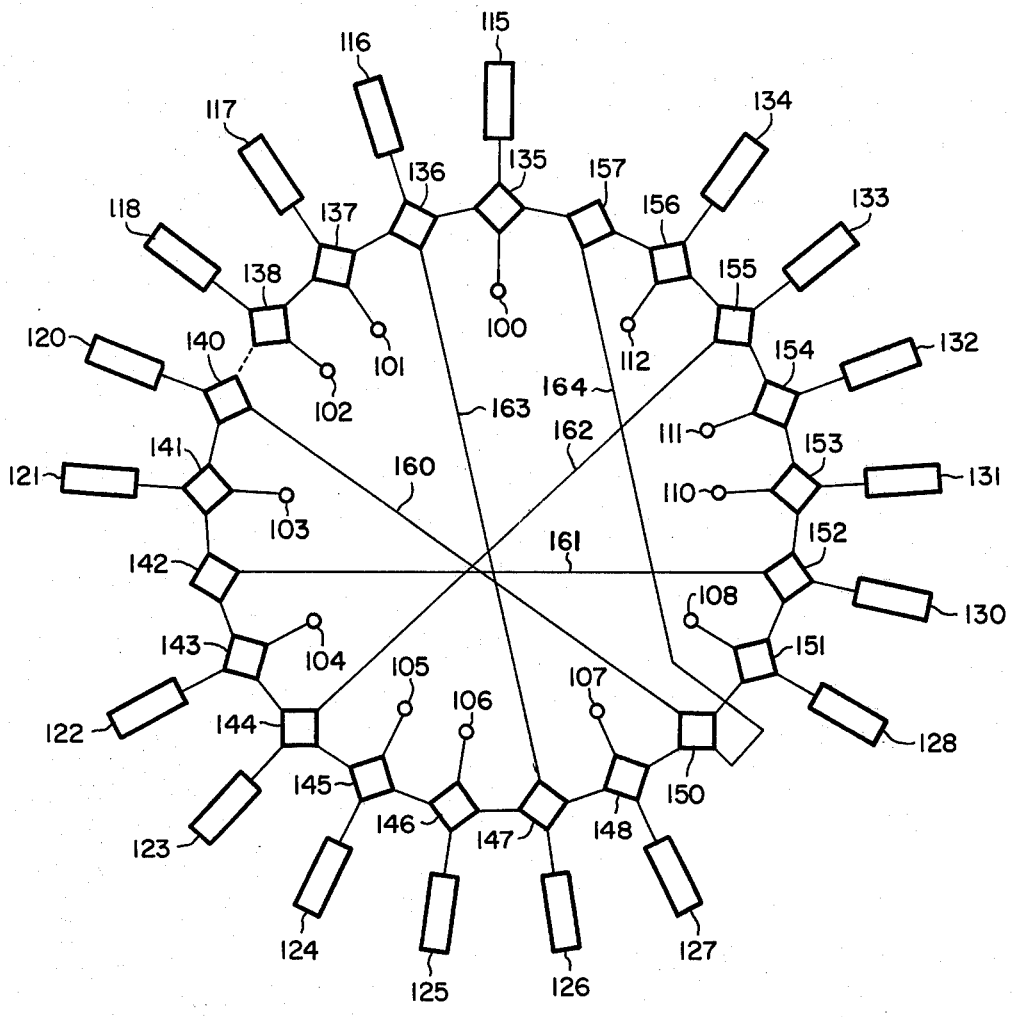
FIG. 10 shows another redundancy switching system in accordance with the present invention consisting of twelve output ports, twenty-one switches and eighteen elements, the standby elements being cross-connectable by switches to provide blockage-free redundancy.

Referring now to FIG. 10, there is illustrated a second embodiment of the present invention. In this switching system there are not only more elements than ports, but also more switches than elements. Thus, the embodiment of FIG. 10 has 12 terminals or ports 100, 101, 102, 103, 104, 105, 106, 107, 108, 109, 110, 111 and 112. On the other hand, the embodiment has 18 elements or amplifiers 115, 116, 117, 118, 120, 121, 122, 123, 124, 125, 126, 127, 128, 130, 131, 132, 133 and 134. Finally, the switching system is provided with 21 switches, that is three more switches than elements 115 – 134. Thus, the 21 switches are designated 135, 136, 137, 138, 140, 141, 142, 143, 144, 145, 146, 147, 148, 150, 151, 152, 153, 154, 155, 156 and 157. All 21 switches 135 – 157 are connected in a closed loop. Each switch, except switches 142, 150 and 157 is connected to one of the elements 115-134.

In addition, there are five cross connections 137, 138, 140, 141 and 142. Cross connection 160 interconnects switches 140, 150; cross connection 161 interconnects switches 142 and 152; cross connection 162 interconnects switches 144 and 155; cross connection 163 interconnects switches 147 and 136 and finally cross connection 164 interconnects switches 150, 157.

Hence, element 116 may be connected by switches 136, 137 to port 101 or by switches 136, 135 to port 100 or by switch 136 and cross connection 141 and switches 147, 146 to port 106 or to port 107 by switches 147, 148. The other elements connected through the cross connections such as elements 120, 123, 126, 130 or 133 can be similarly connected either to an adjacent port or to a port on the opposite side. Hence, by the addition of three switches and 5 cross paths a much greater flexibility may be obtained so that M − N elements can be connected without blockage even though M − N elements have failed. It should be also noted that switches 142, 150 and 157 are not directly connected to an element but are capable of connecting through their respective switches to a neighboring port.

There has thus been diclosed a redundancy switching system particularly suitable for a transponder of the type used in a satellite. The system is independent of the number of switches and ports. It can be so designed that even the redundancy switch itself becomes redundant. The total weight of the system and its size are only linearly proportional to the number of elements in the system. As long as all elements have the same characteristics any element may be connected to any port at will as long as the ports are not blocked. Blockage may be eliminated by use of spoke connectors of the type illustrated in FIG. 10. Various switches may be used for the system such as three-port or four-port switching arrangement, transfer switches, 2 or 3 pole switches which may be ganged, coaxial or waveguide switches.

What is claimed is:

1. In a transponder for a communication system, a redundancy switching system comprising:
   a. a first plurality of elements, said elements being identical;
   b. a second plurality of terminals for transmitting or receiving a plurality of signals of different frequencies and representing different data, said second plurality being no more than said first plurality; and
   c. switching means connected to each of said elements, said switching means being interconnected in a closed loop, some of said elements being standby elements, whereby upon failure of one of said elements a standby element is connectable by at least one of said switching means to one of said terminals.

2. A system as defined in claim 1 wherein each of said elements is an active element.

3. A system as defined in claim 1 wherein each of said terminals is an output port.

4. A system as defined in claim 1 wherein each of said terminals in an input port.

5. A system as defined in claim 1 wherein selected pairs of said switching means are directly interconnected.

6. A system as defined in claim 1 wherein said switching means provide three ports.

7. A system as defined in claim 1 wherein said switching means provide four ports.

8. A system as defined in claim 1 wherein said switching means consists each of a two-pole transfer switch.

9. A system as defined in claim 1 wherein each of said switching means consist of a three-pole transfer switch, said switches being ganged.

10. A system as defined in claim 1 where said switching means consist of coaxial switches.

11. A system as defined in claim 1 wherein each of said switching means consist of a waveguide switch.

12. In a transponder for a communication system, a redundancy switching system comprising:
   a. a first plurality of elements, said elements being identical;
   b. a second plurality of terminals for transmitting or receiving a plurality of signals of different frequencies and representing different data, the total number of said elements being larger than the total number of said terminals; and
   c. switching means connected to each other in a closed loop, the number of switching means being larger than the number of said elements, there being one switching means associated with each element, some of said elements being standby elements, whereby upon failure of one of said elements a standby element is connectable by said switching means to one of said terminals.

* * * * *